(12) United States Patent
Kristola et al.

(10) Patent No.: US 10,288,466 B2
(45) Date of Patent: May 14, 2019

(54) FLOW TOTALIZER

(71) Applicant: Sentry Equipment Corp., Oconomowoc, WI (US)

(72) Inventors: Jay L. Kristola, Mayville, WI (US); Tanner Hallett, Oconomowoc, WI (US)

(73) Assignee: Sentry Equipment Corp., Oconomowoc, WI (US)

( * ) Notice: Subject to any disclaimer, the term of this patent is extended or adjusted under 35 U.S.C. 154(b) by 118 days.

(21) Appl. No.: 15/638,489

(22) Filed: Jun. 30, 2017

(65) Prior Publication Data

US 2019/0003864 A1   Jan. 3, 2019

(51) Int. Cl.
*G01F 3/16* (2006.01)
*F16K 31/56* (2006.01)
*F16K 31/122* (2006.01)

(52) U.S. Cl.
CPC .............. *G01F 3/16* (2013.01); *F16K 31/566* (2013.01); *F16K 31/1226* (2013.01)

(58) Field of Classification Search
CPC ..... G01F 1/26; G01F 3/02; G01F 3/04; G01F 3/14; G01F 3/16; G01F 3/18; G01F 3/00; G01F 15/07; F16K 31/566; F16K 31/1226
See application file for complete search history.

(56) References Cited

U.S. PATENT DOCUMENTS

| 410,408 | A | * | 9/1889 | Fox | ............................ | G01F 3/16 73/249 |
| 4,253,341 | A | | 3/1981 | Ikeda et al. | | |
| 5,408,886 | A | * | 4/1995 | Lalin | ........................ | G01F 3/16 73/248 |
| 5,505,593 | A | * | 4/1996 | Hartley | ................. | F01B 11/004 417/393 |
| 5,527,451 | A | | 6/1996 | Hembree et al. | | |
| 5,935,426 | A | | 8/1999 | Giordano et al. | | |
| 6,149,801 | A | | 11/2000 | Giordano et al. | | |
| 8,489,342 | B2 | | 7/2013 | Dugger et al. | | |

* cited by examiner

*Primary Examiner* — Justin N Olamit
(74) *Attorney, Agent, or Firm* — Jansson Munger McKinley & Kirby Ltd.

(57) ABSTRACT

A flow totalizer apparatus for totalizing the volume of fluid flowing through the inventive apparatus. The apparatus includes a cylinder having a first cylinder port at one end and a second cylinder port at an opposite end, a piston slidably mounted within the cylinder, a bistable spring mechanism, a directional control valve and a counter. The bistable spring mechanism has a motion axis with two stable positions therealong and includes a drive pin, a piston slotted bar and a spool slotted bar, both slotted bars slidably connected to the drive pin and aligned with the motion axis. The total volume is estimated by cylinder volume times the number of stable-position changes of the bistable spring mechanism.

7 Claims, 5 Drawing Sheets

FLOW TOTALIZER

FIELD OF THE INVENTION

The present invention generally relates to the area of liquid flow measurement, and more particularly to apparatus which measures the total volume of fluid flowing through the device.

BACKGROUND OF THE INVENTION

A variety of systems for fluid metering and totalizing are known. However, numerous disadvantages and shortcomings exist with prior systems, and there is a need for improvement to overcome such disadvantages and shortcomings. Some examples of fluid measuring devices of the prior art are disclosed in U.S. Pat. Ser. Nos. 8,489,342 and 5,527,451.

Fluid metering systems of many varieties are known. The systems of the prior art have several drawbacks. Many such systems use the motive energy of the water to rotate an element (such as a paddle wheel). The rotation of this element is then correlated to fluid flow. Such devices of the prior art require machined clearances to allow rotation so that water can pass through the wheel directly (the water that bypasses the wheel is not included in the total flow calculation leading to inaccurate results). The inaccuracy of this method is one such drawback found in the prior art. It would be preferable to have a fluid metering device which prevents fluid from bypassing unmeasured and which therefore, is more accurate than what is found in the prior art.

Another drawback found in the prior art is that fluid metering systems require an outside power source (such as electricity, a battery or compressed gas) to function. It would be preferable to have a metering device which does not require a power source to function.

The fluid metering device of this invention provides a mechanical apparatus and method to determine the volume of fluid that passes through it. The device is actuated entirely by the pressure and flow of the water being measured. The device requires no outside energy source and operates using positive displacement of a piston within a cylinder to measure the amount of an incompressible fluid flowing therethrough.

It is to all the above-noted needs that the device of this application is drawn. This invention addresses and overcomes such problems.

OBJECTS OF THE INVENTION

An object of the present invention is to provide an improved fluid metering device with improved accuracy.

Another object of this invention is to provide an improved fluid metering device which does not require an outside energy source to operate.

SUMMARY OF THE INVENTION

The present invention is a flow totalizer apparatus for totalizing the volume of fluid flowing through the apparatus. The apparatus includes a cylinder having a first cylinder port at one end and a second cylinder port at an opposite end, a piston slidably mounted within the cylinder, a bistable spring mechanism, a directional control valve and a counter. The bistable spring mechanism has a motion axis with two stable positions therealong and includes a drive pin, a piston slotted bar slidably connected to the drive pin and aligned with the motion axis and a spool slotted bar slidably connected to the drive pin and aligned with the motion axis. The directional control valve has an inlet port, an outlet port, a first controlled port in fluid communication with the first cylinder port, second and third controlled ports each in fluid communication with the second cylinder port and a valve spool configured to connect, in a first spool position the inlet port to the first controlled port and the outlet port to the second controlled port, and in a second spool position, to connect the inlet port to the third controlled port and the outlet port to the first controlled port. The counter is configured to count the number of stable-position changes of the bistable spring mechanism. The total volume is estimated by cylinder volume times the number of stable-position changes.

Preferably, the counter is connected to the spool slotted bar. In some preferred embodiments, the counter is a mechanical counter.

Some preferred embodiments of the inventive flow totalizer include an indicator which indicates piston-travel fraction within the cylinder, and the estimated total volume is equal to cylinder volume times the number of stable-position changes plus cylinder volume times the piston-travel fraction. In some of these embodiments, the indicator comprises measurement markers on the piston slotted bar indicating the position of the piston in the cylinder.

In other preferred embodiments, the apparatus has a motion axis or motion path which includes a piston slidably mounted within the cylinder, the motion of the piston being parallel to the motion axis and a bistable spring mechanism having two stable positions along a mechanism axis parallel to the motion axis. The bistable spring mechanism includes a drive pin, a piston slotted bar slidably connected to the drive pin and aligned parallel to the motion axis and a valve slotted bar slidably connected to the drive pin and aligned parallel to the motion axis. In such embodiments, the valve spool has a spool axis parallel to the motion axis, the first spool position corresponds to one of the two stable positions, and the second spool position corresponds to the other stable position.

The term "aligned with" as used herein means that the major axis of an object is substantially parallel to that with which it is aligned and does not necessarily indicate that such major axis is coincident with that with which it is aligned, although such coincidence is one such possible alignment. In some cases, motion along a motion axis (motion path) may not be linear, but the term "aligned with" includes being substantially parallel to such motion path, linear or otherwise.

BRIEF DESCRIPTION OF THE DRAWINGS

The drawings illustrate a preferred embodiment including the above-noted characteristics and features of the invention. The invention will be readily understood from the descriptions and drawings. In the drawings:

FIG. 2A is a time plot of a representative input flow to be measured by the flow totalizer of FIG. 1.

FIG. 2B is a simulated time plot of the total flow (totalized flow) based on the input flow of FIG. 2A.

FIG. 2C is a simulated time plot of the piston position in the flow totalizer of FIG. 1 as indicated by piston-travel fraction.

FIG. 2D is a simulated time plot of the valve-spool position in the flow totalizer of FIG. 1.

FIG. 2E is a simulated time plot of the counter output (count) in the flow totalizer of FIG. 1.

FIG. 3A is a schematic illustration of the flow totalizer of FIG. 1 with the valve spool in the first spool position immediately after entering such position.

FIG. 3B is a schematic illustration of the flow totalizer of FIG. 1 with the valve spool in the second spool position immediately after entering such position.

FIG. 3C is a schematic illustration of the flow totalizer of FIG. 1 with the valve spool in the second spool position and the piston approaching the end of the cylinder having the first port, prior to triggering the valve spool from the second spool position to the first spool position.

FIG. 5A is a schematic illustration of the bistable spring mechanism embodiment with the spool slotted bar in the second spool position immediately after entering such position.

FIG. 5B is a schematic illustration of the bistable spring mechanism embodiment with the spool slotted bar in the second spool position just prior to the triggering of the bistable spring mechanism into the first spool position.

FIG. 5C is a schematic illustration of the bistable spring mechanism embodiment with the spool slotted bar in the first spool position immediately after entering such position.

DETAILED DESCRIPTION OF PREFERRED EMBODIMENTS

Figure 1:
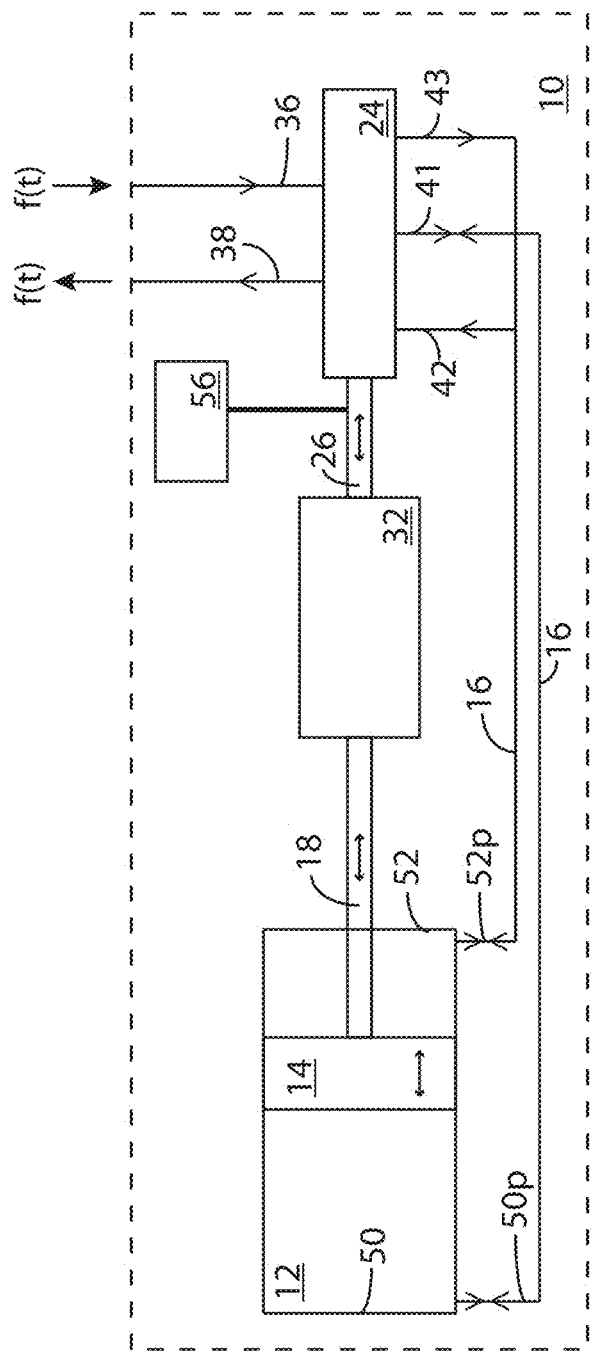
FIG. 1 is a block diagram schematic drawing of the inventive flow totalizer.

FIG. 1 is a block diagram schematic of the inventive flow totalizer apparatus 10. Input flow f(t) flows into apparatus 10 via an input port 36 and out from apparatus 10 via an output port 38. Flow f(t) represents a flow of a liquid which is incompressible and thus both input and output flows are represented by f(t). Flow f(t) is in units of liquid volume per unit time. No specific units are given herein since the specific units of measure are not important to the details of the inventive flow totalizer.

Apparatus 10 includes a piston 14 slidably mounted in a cylinder 12. Cylinder 12 has a first cylinder port 50p located at one end 50 of cylinder 12 and a second cylinder port 52p located at an opposite end 52. Piston 14 is mechanically connected to a piston slotted bar 18 (also called a piston slotted linkage) which is part of a bistable spring mechanism 32. Also part of bistable spring mechanism 32 is a spool slotted bar 26 (also called a valve slotted linkage) which is mechanically connected to a spool 30 (see FIGS. 3A-3C) of a spool valve 24 (directional control valve).

Movement of piston 14 within cylinder 12 is driven by flow f(t) flowing into either first cylinder port 50p or second cylinder port 52p depending on the position of spool 30 within spool valve 24. Piston 14 movement drives piston slotted bar 18 which in turn triggers the position of spool 30, such triggering causing the rapid change of the position of spool 30 into one of two stable positions along a motion axis 34 (or motion path) which in turn changes to input/output modes of ports 50p and 52p. Thus, the motion of piston 14 becomes reciprocating motion determined by input flow f(t) and the position of spool 30. Further details of the operation of an embodiment of bistable spring mechanism 32 is found later in this application.

Figure 2A:
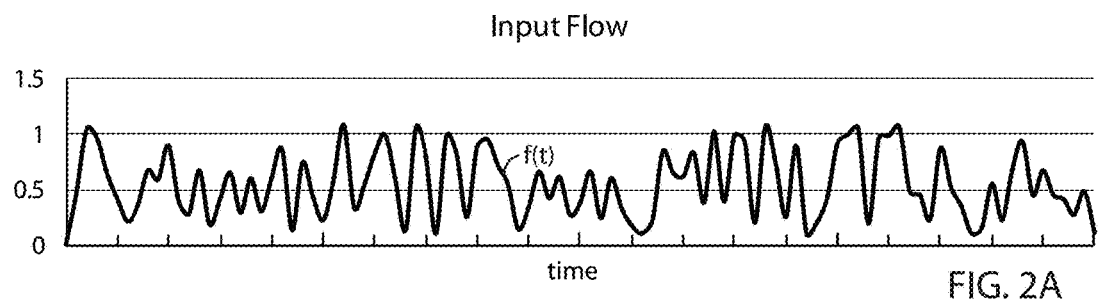
FIGS. 2A through 2E are time plots of simulated operation of the flow totalizer of FIG. 1.
Figure 2B:
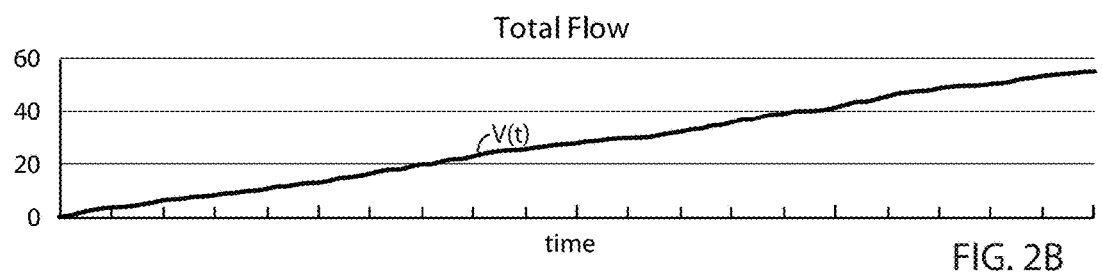
Figure 2C:
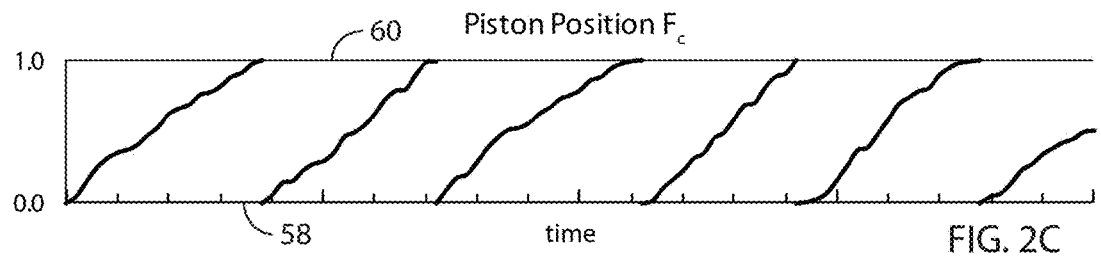
Figure 2D:
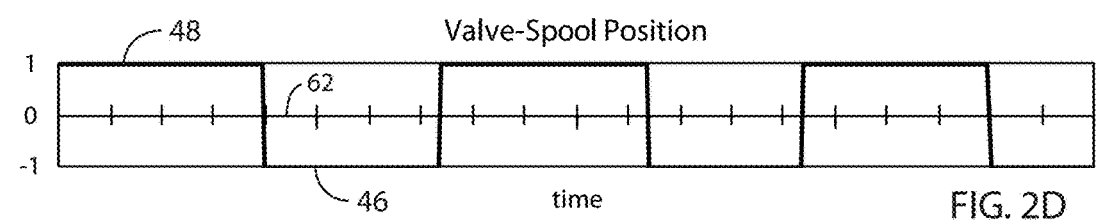
Figure 3A:
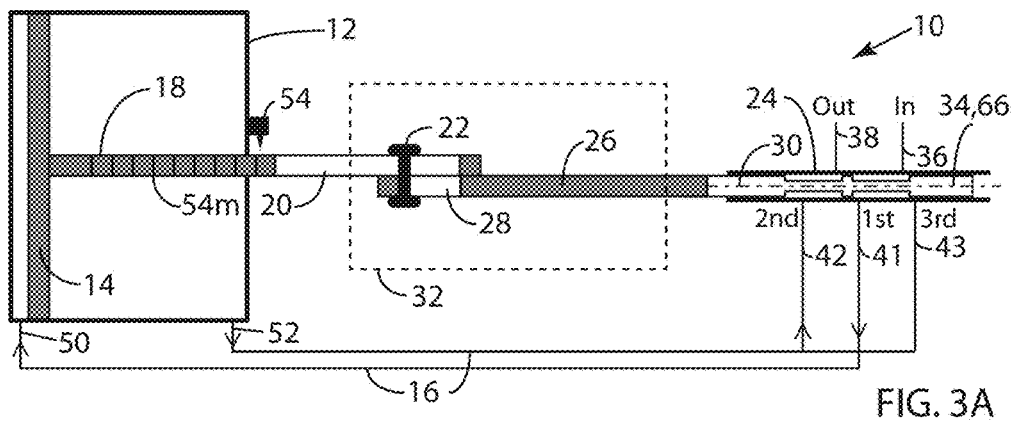
FIGS. 3A through 3C are schematic illustrations of the flow totalizer of FIG. 1 with the elements of the flow totalizer in various operational positions.
Figure 3B:
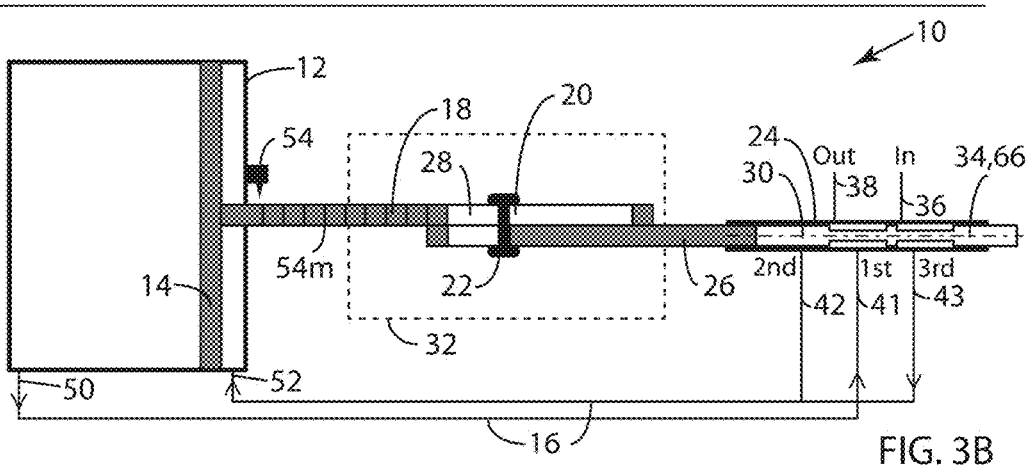
Figure 3C:
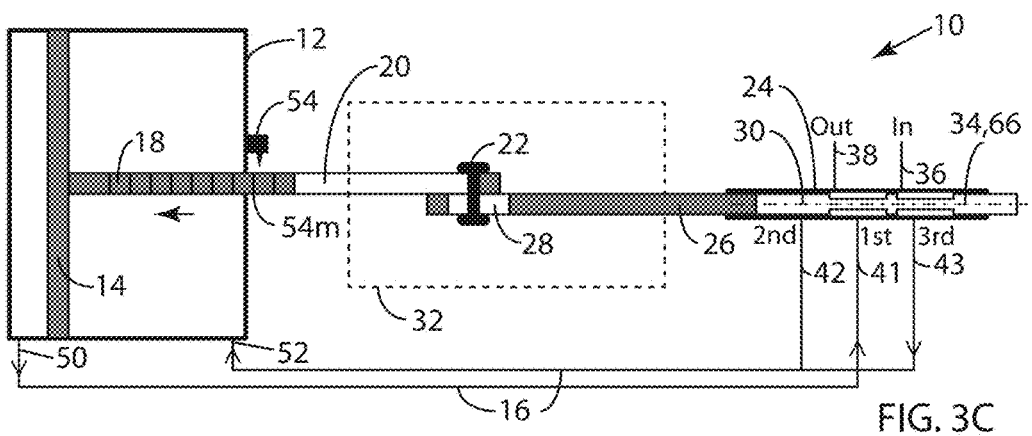

The two stable positions of bistable spring mechanism 32 are a first spool position 46 and a second spool position 48 as illustrated in FIGS. 2D, 3A-3C and 4. Spool valve 24 includes inlet port 36, outlet port 38, and three controlled ports, a first controlled port 41, and second controlled port 42, and a third controlled port 43. Spool valve 24 is configured such that when spool 30 is in first spool position 46, inlet port 36 is in fluid communication with first controlled port 41 and outlet port 38 is in fluid communication with second controlled port 42. And, when spool 30 is in second spool position 48, inlet port 36 is in fluid communication with third controlled port 43 and outlet port 38 is in fluid communication with first controlled port 41. Thus, when the position of spool 30 changes from one stable spool position to the other, the direction of flow f(t) in first controlled port 41 changes and input flow f(t) changes from flowing through one of the remaining controlled ports to the other remaining controlled port. Such flow-direction changes are also indicated in FIG. 1 in the appropriate ports and in two flow conduits 16 through which flow f(t) travels by including arrows in both directions at ports 50p, 52p, and 41 and along both conduits 16. FIGS. 3A-3C more specifically indicate flow directions in the various operational mode of apparatus 10.

Such triggered reciprocating operation of spool valve 24 results in the reciprocating motion of piston 14 between a minimum volume $V_{min}$ of the cylinder and a maximum volume $V_{max}$ of the cylinder, the difference of which defines a cylinder volume $V_c$. Each time the stable position of bistable spring mechanism 32 changes, such change is counted by a counter 56, and the totalized volume V(t) of flow f(t) is estimated as $V(t)=C(t)\cdot V_c$ where C(t) is the count of counter 56 at time t. Counter 56 is connected to spool slotted bar 26 but may also be connected to any point which gives indication of stable-position change within apparatus 10, such as being connected to piston slotted bar 18 with counter 56 being responsive to direction reversals of bar 18, such reversals corresponding to stable-position changes of bistable spring mechanism 32. Counter 10 may be a simple mechanical counter well-known to those skilled in mechanical systems, but may also be a more complex counter which requires another source of power to operate.

In general, such an estimate of totalized volume V(t) is an accurate enough measure, since cylinder volume $V_c$ is small enough with respect to totalized volume V(t) that an estimate to within $V_c$ is sufficient. However, if a more accurate measure of totalized flow V(t) is desired, piston slotted bar 18 may also include an indicator 54 which provides a indication of the fractional position $F_c$ of piston 14 in cylinder 12 such that totalized volume $V(t)=C(t)\cdot V_c + F_c \cdot V_c$.

Figure 2E:
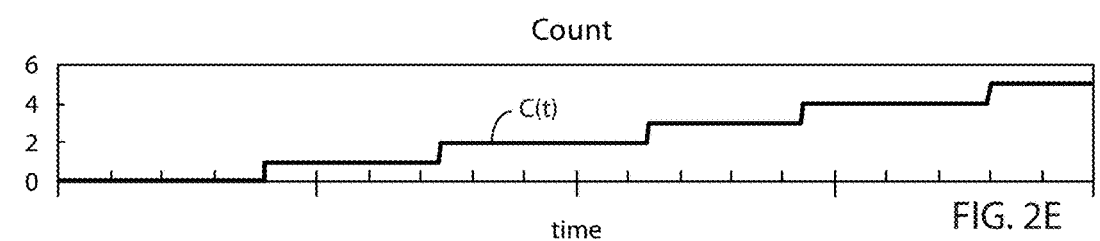

FIGS. 2A through 2E are time plots of simulated operation of flow totalizer 10. FIG. 2A is a time plot of representative input flow f(t) to be measured by flow totalizer 10. FIG. 2B is a simulated time plot of totalized flow V(t) based on input flow f(t). FIG. 2E is a simulated time plot of counter 56 output C(t) in flow totalizer 10. Note that V(t) as shown in FIG. 2B represents values of V(t) which are determined from both count C(t) and from indicator 54.

FIG. 2C is a simulated time plot of piston 14 position in flow totalizer 10 as measured by piston-travel fraction $F_c$. In this time plot, note that piston-travel fraction $F_c$ is measured from the beginning of each change of direction of piston 14 so that immediately upon a trigger of bistable spring mechanism 32, during which spool 30 moves from one stable position to the other, the indication of piston-travel fraction $F_c$ changes from 1.0 to 0 and then begins to increase as more liquid flows into apparatus 10.

The units of measure as shown in FIGS. 2A-2E are arbitrary and not relevant to the structure of the inventive flow totalizer. Nevertheless, the units of flow f(t) and totalized volume V(t) are consistent in these figures. The units of piston position in FIG. 2C are piston-travel. In FIG. 2D, the numerical value–1 represents first spool position 46, and the numerical value 1 represents second spool position 48.

FIGS. 3A through 3C are schematic illustrations of flow totalizer 10 with the components in various operational positions. FIG. 3A is a schematic illustration of flow totalizer 10 with valve spool 30 in first spool position 46 immediately following a triggering of bistable spring mechanism 32. (Spool positions 46 and 48 are by the use of brackets.) In such position, piston 14 is positioned such that the volume of liquid in cylinder 12 is $V_{min}$ and piston-travel fraction $F_c$ is 0 as indicated by piston travel-fraction indicator 54.

FIG. 3B is a schematic illustration of flow totalizer 10 with valve spool 30 in second spool position 48 immediately following a triggering of bistable spring mechanism 32. In such position, piston 14 is positioned such that the volume of liquid in cylinder 12 is $V_{max}$ but again piston-travel fraction $F_c$ is 0 as indicated by piston travel-fraction indicator 54, $F_c$ having changed from 1 to 0 immediately upon such triggering.

FIG. 3C is a schematic illustration of flow totalizer 10 with valve spool 30 in second spool position 48 and piston 14 approaching first cylinder end 50 and prior to the next triggering of valve spool 30 from second spool position 48 to first spool position 46.

FIGS. 3A-3C include illustration of a drive pin 22 which slidably connects both piston slotted bar 18 and spool slotted bar 26. Both slotted bars 18 and 26 are aligned with motion axis 34 (also designated herein as a spool axis 66). Drive pin 22 is positioned within both piston slot 20 of piston slotted bar 18 and spool slot 28 of spool slotted bar 26. Drive pin 22 serves to cause piston slotted bar 18 to push spool slotted bar 26 past a trigger position 62 (see FIGS. 4 and 5A-5C) at which point spool slotted bar 26 rapidly is moved from one stable position of bistable spring mechanism 32 to the other stable position of bistable spring mechanism 32, thereby causing spool 30 to change from first spool position 46 to second spool position 48, or vice versa and to reverse the direction of flow through conduits 16 and ports 41, 50p and 52p.

Also illustrated in FIGS. 3A-3C are a simple visual and mechanical embodiment of indicator 54 with a set of measurement markers 54m on piston slotted bar 18. Indicator 54 may also be a more sophisticated sensor which may or may not require another source of power to operate.

Figure 4:
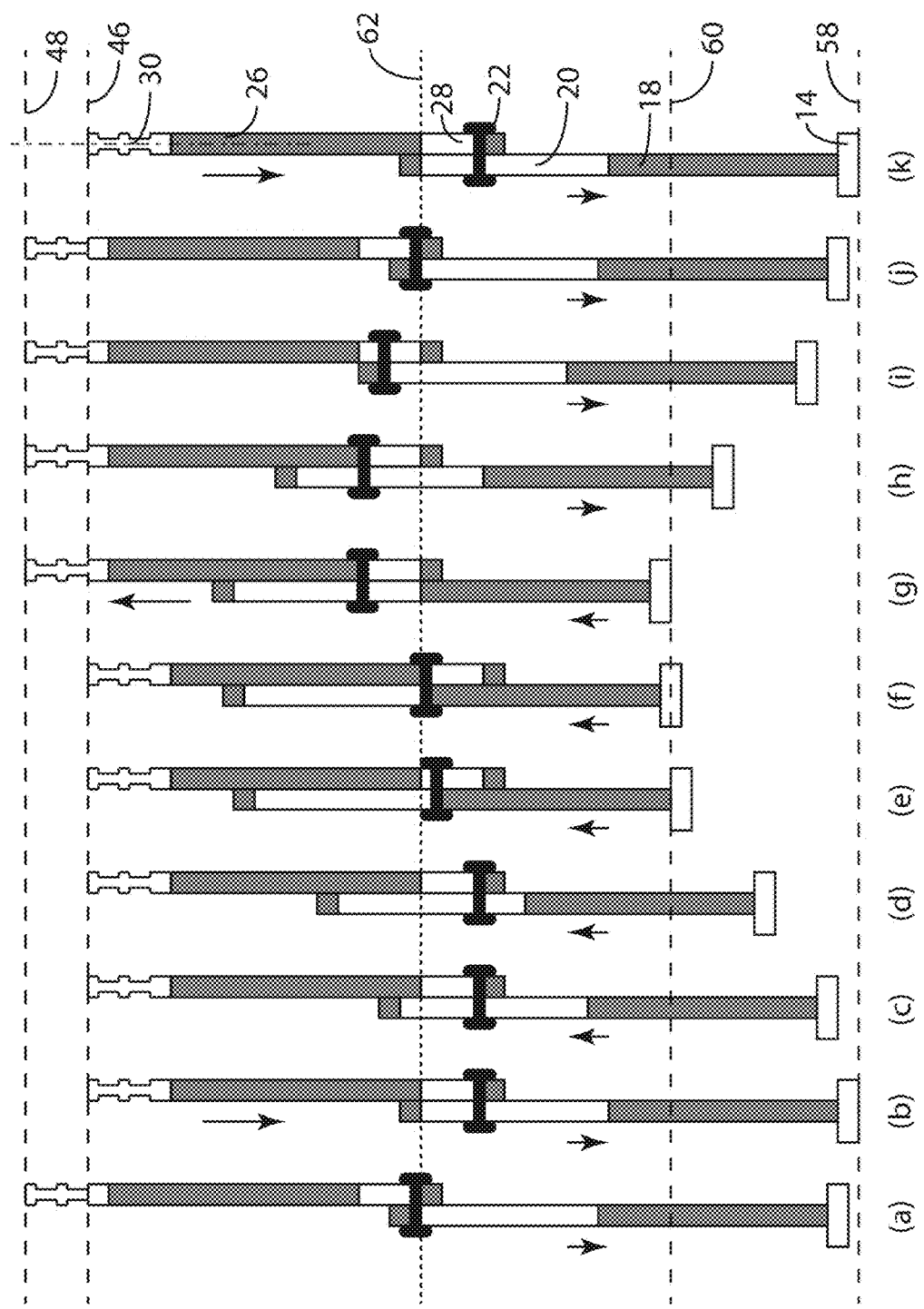
FIG. 4 is a set of eleven schematic illustrations of a time history of various elements of the flow totalizer further illustrating the operation of the flow totalizer of FIG. 1. The illustrations are labeled (a) through (k).

FIG. 4 is a set of eleven schematic illustrations, labeled (a) through (k), of a time history of various components of flow totalizer 10 to further illustrate its operation. FIG. 4 uses a reduced set of the components illustrated in FIGS. 3A-3C and simplifies the schematic illustrations of piston 14 and spool 30. Only one illustration (k) is labeled with reference numbers to remove unnecessary clutter within FIG. 4. The shorter arrows next to piston slotted bar 18 indicate motion of piston slotted bar 18, and the longer arrows next to spool slotted bar 26 indicate the discrete and rapid change in the position of spool slotted bar 26 immediately prior to the positions of spool slotted bar 26 in the illustrations labeled (b), (g) and (k). Note that illustrations (b) and (k) are identical.

FIG. 4 illustrates the limits of motion of spool 30 as indicated by first spool position 46 and second spool position 48 and the limits of motion of piston 14 as indicated by first piston position 58 and second piston position 60. FIG. 4 also illustrates trigger position 62, the point along motion axis 34 (spool axis 66) at which bistable spring mechanism 32 triggers to change from one stable position to the other stable position.

Figure 5A:
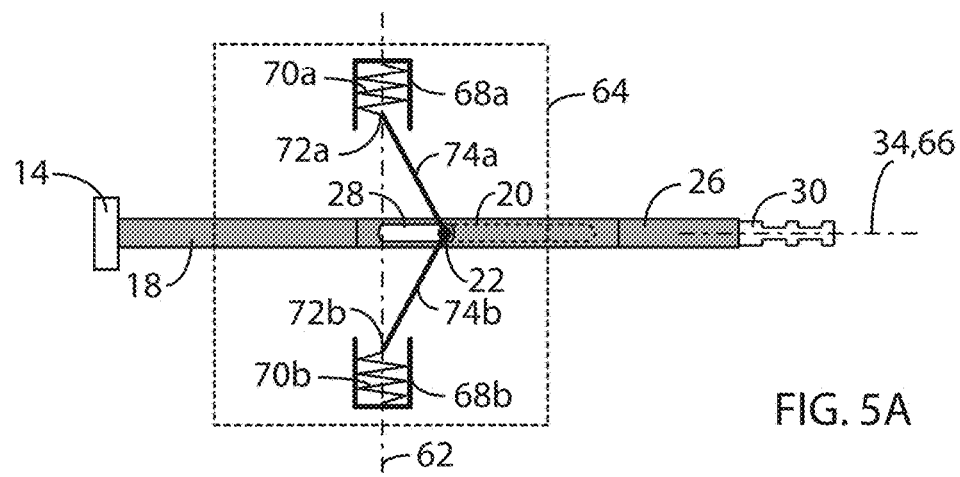
FIGS. 5A-5C are schematic illustrations of an embodiment of a bistable spring mechanism for an embodiment of the flow totalizer of FIG. 1.
Figure 5B:
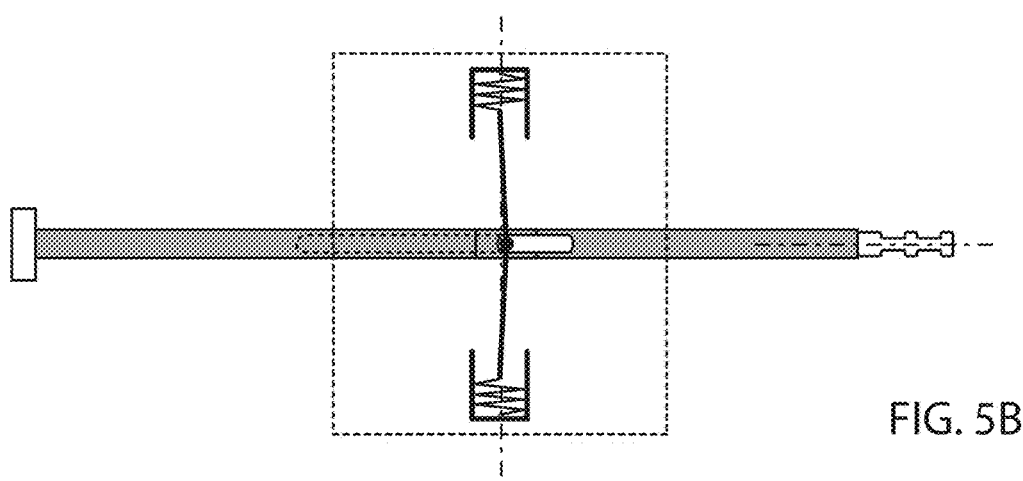
Figure 5C:
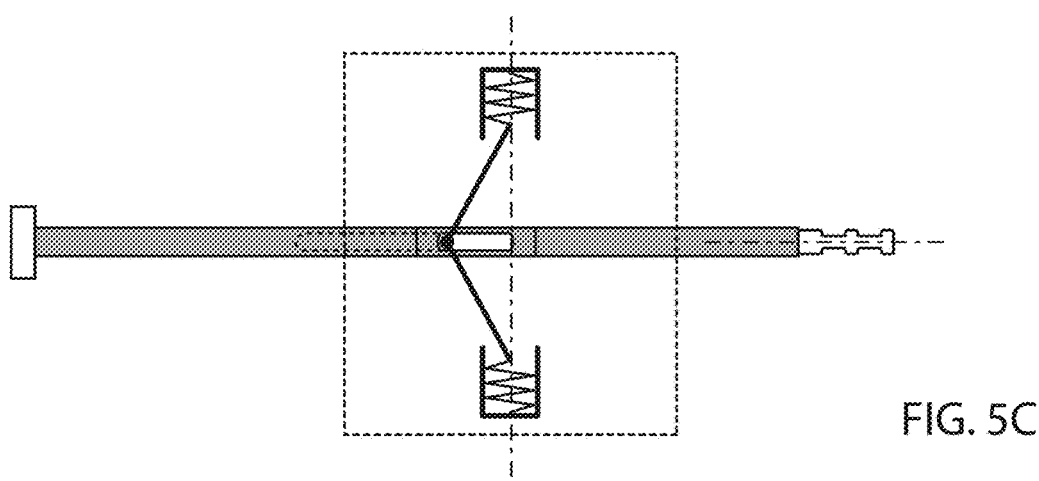

FIGS. 5A-5C are schematic illustrations of an embodiment 64 of bistable spring mechanism 32 which can be used within flow totalizer 10 to provide discrete and rapid movement of spool 30 within spool valve 24. Only FIG. 5A includes reference-number labeling to avoid clutter in the other two illustrations.

FIG. 5A is a schematic illustration of bistable spring mechanism embodiment 64 with spool slotted bar 26 in second spool position 48 immediately after entering such position. FIG. 5B is a schematic illustration of bistable spring mechanism embodiment 64 with spool slotted bar 26 in second spool position 48 just prior to the triggering of bistable spring mechanism embodiment 64 into first spool position 46. (Spool positions 46 and 48 are indicated by the use of brackets.) FIG. 5C is a schematic illustration of bistable spring mechanism embodiment 64 with spool slotted bar 26 in first spool position 46 immediately after entering such position.

Bistable spring mechanism embodiment 64 utilizes spring forces supplied by a first spring member 70a and a second spring member 70b of a first spring assembly 68a and second spring mechanism 68b, respectively. Such springs provide spring forces which are substantially perpendicular to motion axis 34. Within this configuration, the movement of drive pin 22 past trigger position 62 causes discrete and rapid movement of spool slotted bar 26 from one stable position to the other stable position. Many other configurations of bistable spring mechanisms are well-known to those skilled in the area of mechanical systems. One such other bistable spring mechanism is a simple band of material such as spring steel or other suitable material which is configured as an arc between two fixed end points. Such a band has two stable positions and behaves mechanically in a similar fashion to bistable spring mechanism embodiment 64.

In embodiment 64, spring members 70a and 70b are illustrated schematically with a symbol which appears as a simple coil spring. However, this symbol is only schematic; the spring forces may be supplied by other devices such as resilient materials or resilient bands mounted within spring mechanisms 68a and 68b.

Wide varieties of materials are available for the various parts discussed and illustrated herein. While the principles of this invention and related method have been described in connection with specific embodiments, it should be understood clearly that these descriptions are made only by way of example and are not intended to limit the scope of the application. It is believed that the invention has been described in such detail as to enable those skilled in the art to understand the same and it will be appreciated that variations may be made without departing from the spirit and scope of the invention.

The invention claimed is:
1. Flow totalizer apparatus for totalizing the volume of fluid flowing therethrough, the apparatus comprising:
   a cylinder having a first cylinder port at one end and a second cylinder port at an opposite end;

a piston slidably mounted within the cylinder;
a bistable spring mechanism with a motion axis having two stable positions therealong and including:
  a drive pin;
  a piston slotted bar slidably connected to the drive pin and aligned with the motion axis; and
  a spool slotted bar slidably connected to the drive pin and aligned with the motion axis;
a directional control valve having:
  an inlet port;
  an outlet port;
  a first controlled port in fluid communication with the first cylinder port;
  second and third controlled ports each in fluid communication with the second cylinder port; and
  a valve spool configured, in a first spool position, to connect the inlet port to the first controlled port and the outlet port to the second controlled port, and in a second spool position, to connect the inlet port to the third controlled port and the outlet port to the first controlled port; and
a counter configured to count stable-position changes of the bistable spring mechanism.

2. The apparatus of claim 1 wherein the counter is connected to the spool slotted bar.

3. The apparatus of claim 1 further including an indicator which indicates piston-travel fraction within the cylinder, and an estimate of the total volume is equal to cylinder volume times the number of stable-position changes plus cylinder volume times the piston-travel fraction.

4. The apparatus of claim 3 wherein the indicator includes measurement markers on the piston slotted bar which indicate the position of the piston in the cylinder.

5. The apparatus of claim 1 wherein the counter is a mechanical counter.

6. Apparatus for measuring the total volume of fluid flowing therethrough, the apparatus comprising:
a cylinder having a first cylinder port at one end and a second cylinder port at an opposite end;
a piston slidably mounted within the cylinder;
a bistable spring mechanism with a motion path having two stable positions therealong and including:
  a drive pin;
  a piston slotted linkage slidably connected to the drive pin and aligned with the motion path; and
  a valve slotted linkage slidably connected to the drive pin and aligned with the motion path;
a directional control valve having:
  an inlet port;
  an outlet port;
  a first controlled port in fluid communication with the first cylinder port;
  second and third controlled ports each in fluid communication with the second cylinder port; and
  a valve spool configured, in a first spool position, to connect the inlet port to the first controlled port and the outlet port to the second controlled port, and in a second spool position, to connect the inlet port to the third controlled port and the outlet port to the first controlled port; and
a counter configured to count stable-position changes of the bistable spring mechanism.

7. Apparatus for measuring the volume of fluid flowing therethrough, the apparatus having a motion axis and comprising:
a cylinder having a first cylinder port at one end and a second cylinder port at an opposite end;
a piston slidably mounted within the cylinder, the motion of the piston being aligned with the motion axis;
a spring mechanism having two stable positions along the motion axis and including:
  a drive pin;
  a piston slotted bar slidably connected to the drive pin and aligned with the motion axis; and
  a valve slotted bar slidably connected to the drive pin and aligned with the motion axis;
a directional control valve having:
  an inlet port and an outlet port;
  a first controlled port in fluid communication with the first cylinder port;
  second and third controlled ports each in fluid communication with the second cylinder port; and
  a valve spool having a spool axis aligned with the motion axis, the spool configured, in a first spool position, to connect the inlet port to the first controlled port and the outlet port to the second controlled port, and in a second spool position, to connect the inlet port to the third controlled port and the outlet port to the first controlled port, the first spool position corresponding to one of the two stable positions and the second spool position corresponding to the other stable position; and
a counter for counting stable-position changes of the spring mechanism.

* * * * *